No. 895,969. PATENTED AUG. 11, 1908.
A. P. COYLE.
NOODLE CUTTER.
APPLICATION FILED OCT. 22, 1907.

2 SHEETS—SHEET 1.

Witnesses

Inventor
A. P. Coyle.
By
Attorneys

No. 895,969. PATENTED AUG. 11, 1908.
A. P. COYLE.
NOODLE CUTTER.
APPLICATION FILED OCT. 22, 1907.
2 SHEETS—SHEET 2.
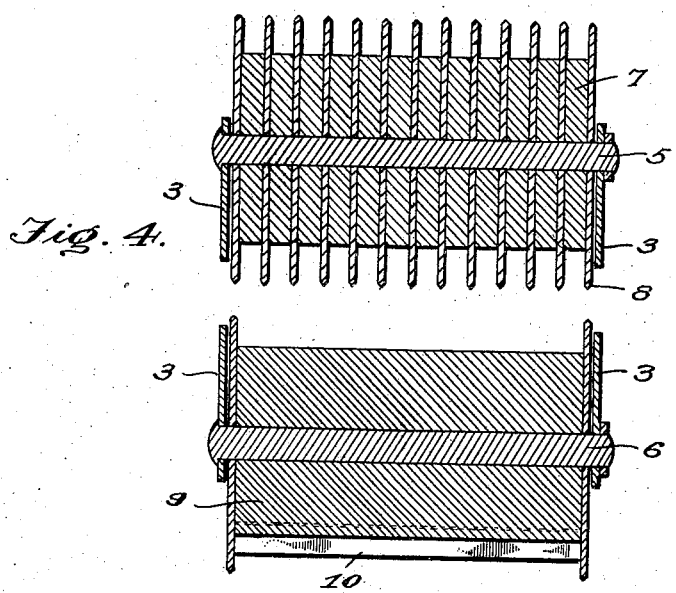
Fig. 4.
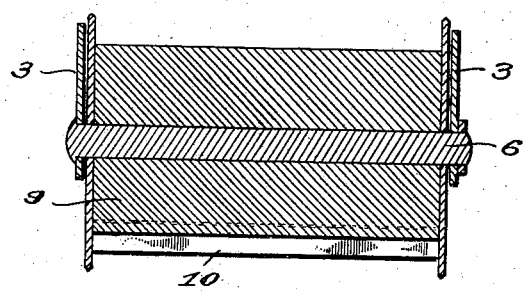
Fig. 5.
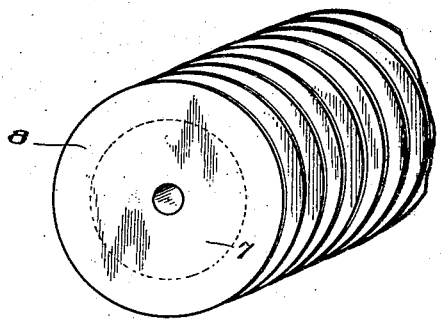
Inventor
A. P. Coyle.
Witnesses
By
Attorneys

UNITED STATES PATENT OFFICE.

ANTHONY P. COYLE, OF JUNIATA, PENNSYLVANIA.

NOODLE-CUTTER.

No. 895,969.  Specification of Letters Patent.  Patented Aug. 11, 1908.

Application filed October 22, 1907. Serial No. 398,635.

*To all whom it may concern:*

Be it known that I, ANTHONY P. COYLE, citizen of the United States, residing at Juniata, in the county of Blair and State of Pennsylvania, have invented certain new and useful Improvements in Noodle-Cutters, of which the following is a specification.

This invention contemplates certain new and useful improvements in cutting apparatus for making noodles, and the invention has for its object a culinary device of this character which is simple and durable in construction, of few parts that may be cheaply manufactured and easily assembled, and that will be effective in operation to cut the dough into a plurality of strips of the desired number and width and sever the same by transverse cuts at the desired intervals, so as to make the desired number of noodles in the shortest possible time.

With this and other objects in view as will more fully appear as the description proceeds, the invention consists in certain constructions, arrangements and combinations of the parts that I shall hereinafter describe and claim.

Figure 1:
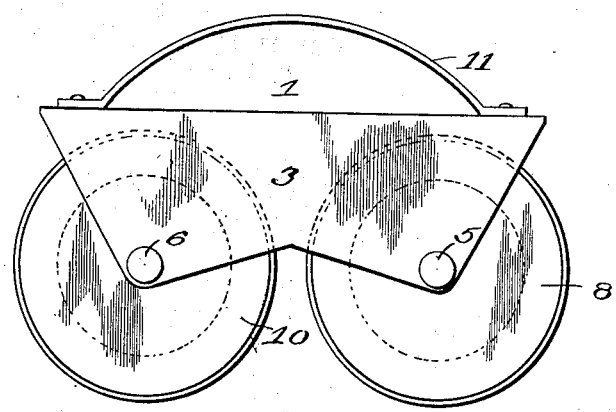
Figure 2:
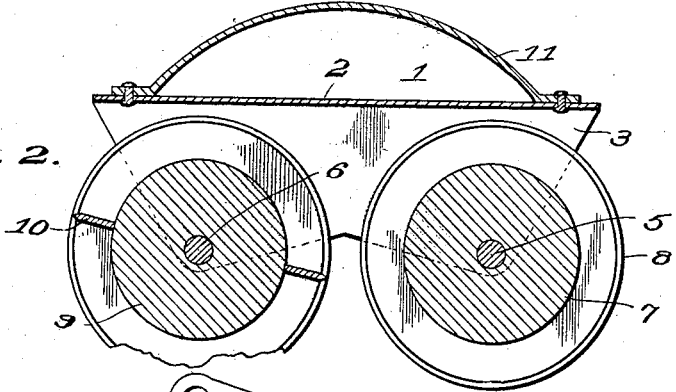
Figure 3:
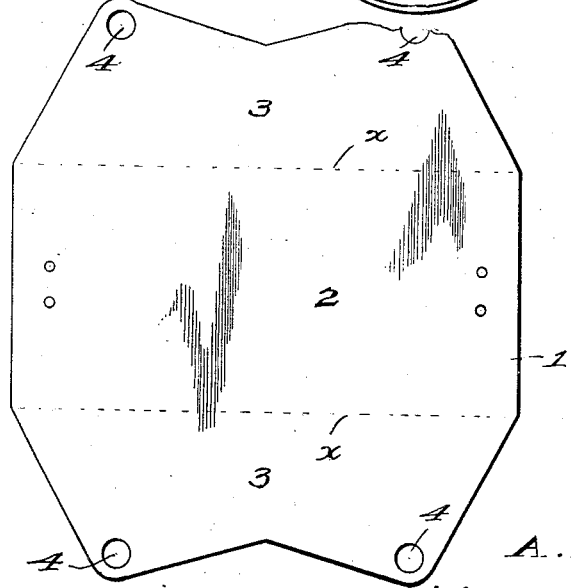

For a full understanding of the invention, reference is to be had to the following description and accompanying drawings, in which:

Figure 1 is a side elevation of my improved noodle cutter; Fig. 2 is a longitudinal sectional view thereof; Fig. 3 is a view of the blank out of which the main supporting member may be formed; Fig. 4 is a horizontal sectional view; and, Fig. 5 is a perspective view of the slicing roller.

Corresponding and like parts are referred to in the following description and indicated in all the views of the drawings by the same reference characters.

The main supporting member of my improved noodle cutter is preferably formed out of a metal sheet or blank of the desired size and shape, as illustrated in Fig. 3, the sheet, after being cut or stamped, being preferably bent along parallel lines, as indicated at X, to form the rectilinear body portion 2, and the two right angularly disposed wings 3 which extend downwardly from the intermediate or main body portion 2. Each one of these wings is formed with bearing openings 4, as clearly illustrated in the drawings.

Shafts 5 and 6 are journaled in the transversely alined openings 4 of the respective wings 3, each of said shafts being preferably provided at one end with a head, as shown, and being threaded at its other end to receive a nut, so that the said shafts may be easily slipped into place or removed. On the shaft 5, the preferably wooden body portion 7 of the slicing roller is mounted, said roller also including a series of spaced disk-like knives 8 held at the desired distance apart by the wooden body portion 7 of the roller. In the present instance, for the purposes of illustration only, I have shown thirteen slicing knives 8, as embodied in the slicing roller, so as to slice the sheet of dough into twelve strips, as the device is run over the sheet.

In order to sever the plurality of strips formed by the slicing roller, I mount a severing roller on the shaft 6, said severing roller embodying the preferably wooden body portion 9 and the transversely extending severing blades 10 which, in the present instance, are two in number located at diametrically opposite points on the wooden body portion 9 and secured thereto in any desired way.

11 designates the handle of the device which preferably extends longitudinally of the main supporting member 1, and which may be riveted or otherwise secured to the intermediate or main body portion 2 thereof.

In the practical use of my improved noodle cutter, the device is grasped by the handle 11 and run over the sheet of dough, knives 8 continuously slicing the dough into strips of the desired length, while the transversely extending blades 10 of the other roller will act intermittently to sever the strips into the requisite length, thereby quickly forming a large quantity of noodles of the desired size. It is to be particularly noted that two rollers are employed in my device. If one roller only were used, embodying both slicing knives and severing blades, the dough would stick in the spaces between the knives and the use of two rollers arranged as hereinbefore described and illustrated in the accompanying drawings effectively obviates this and insures that the noodles will be cut free from the rollers, and any liability of tearing the dough being also effectually avoided.

Having thus described the invention, what is claimed as new is:

A device of the character described, comprising a main supporting member embodying an intermediate or body portion and two wings projecting downwardly from the sides thereof, each of said wings being formed with a pair of bearing openings, shafts journaled in the transversely alined openings of the respective wings, a slicing roller mounted on one of said shafts and embodying a series of disk-like knives spaced from each other, a severing roller mounted on the other shaft and embodying transversely extending severing blades arranged to coact with the slicing knives, and a handle secured to the intermediate or body portion of the supporting member.

In testimony whereof I have affixed my signature in presence of two witnesses.

ANTHONY P. COYLE. [L. S.]

Witnesses:
  H. A. MILLS,
  E. Y. CURVAN.